Feb. 24, 1948.  C. W. GOULD, JR  2,436,567
MICROREFRACTOMETER FOR LIQUIDS
Filed Sept. 15, 1944

INVENTOR.
CLARK W. GOULD JR.
BY
Lyon & Lyon
attys.

Patented Feb. 24, 1948

2,436,567

UNITED STATES PATENT OFFICE 2,436,567

MICROREFRACTOMETER FOR LIQUIDS

Clark Webster Gould, Jr., Pasadena, Calif., assignor to California Institute Research Foundation, Pasadena, Calif., a corporation of California Application September 15, 1944, Serial No. 554,315

4 Claims. (Cl. 88—14)

1

This invention relates to microrefractometers, that is to apparatus for the determination of the refractive index of liquids. The objects of this invention are:

First, to provide an apparatus for the determination of the refractive index of liquids which uses very small samples, that is in the amount of 0.001 cc.

Second, to provide a microrefractometer which reduces to a minimum the hazard to personnel using it when the liquids to be measured are toxic.

Third, to provide a microrefractometer which is capable of measuring the refractive index of relatively volatile liquids or liquids which would soon become contaminated if exposed to air, the liquid being entirely enclosed and sealed within the refractometer.

Fourth, to provide a refractometer which is capable of giving reproducible results to ±0.001 unit.

Fifth, to provide a refractometer which is inexpensive, easy to construct and simple to use.

With these and other objects in view as may appear hereinafter, reference is directed to the accompanying drawings in which.

Figure 1:
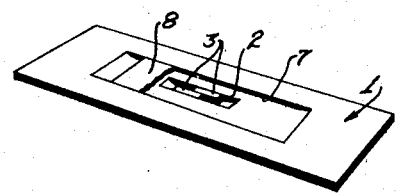
Figure 1 is a perspective view of the microrefractometer.

A glass slide 1 is provided with a recess or cell 2 in the form of a channel cut therein. The bottom of the channel is polished and parallel with the bottom of the slide and has vertical side walls. Two prisms 3 fit within the cell 2.

2

Each prism is rectangular in cross section except for a bevelled prism face 4 at one end. The two prisms are placed side by side in the cell but are axially offset in such a manner that the planes of the bevelled faces intersect along a line located about a quarter of the thickness of the prisms measured from their lower surfaces. This line is directly above an image line 5 inscribed on the bottom surface of the glass slide. The two prisms fill the width of the cell and are cemented to the vertical side walls thereof, as indicated by 6. The cell 2 is located within a shallow recess 7 formed in the surface of the glass slide. This recess receives a thin glass cover plate 8 which covers the cell 2.

Figure 7:
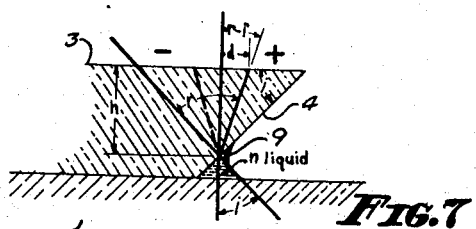
Figure 7 is a diagram to aid in the explanation of the phenomenon observed.
Figure 2:
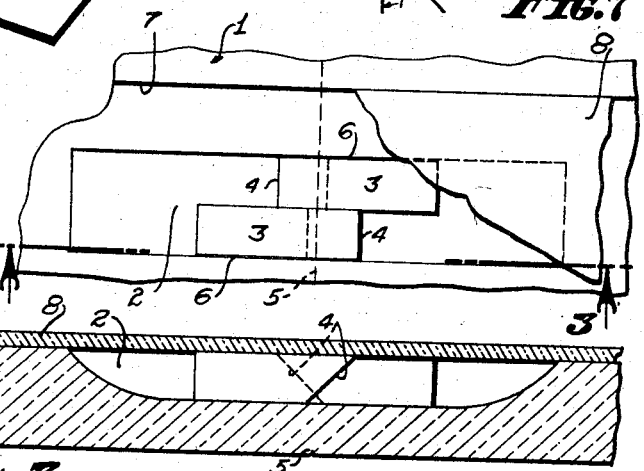
Figure 2 is an enlarged fragmentary plan view thereof.
Figure 3:
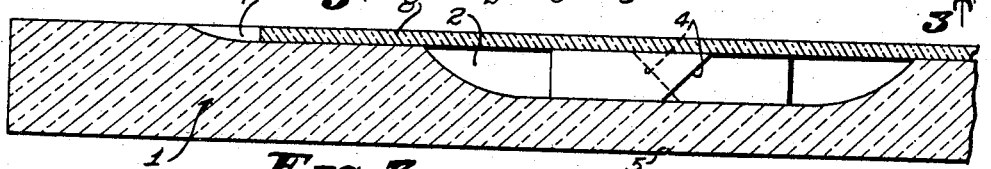
Figure 3 is an enlarged fragmentary sectional view thereof taken through line 3—3 of Figure 2.

In operation, a small liquid sample (about 0.001 cc.) is placed in the cell 2 by means of a capillary pipette, in such a way as to cause the liquid to collect by capillary action in wedges 9 between the bevelled faces 4 and the base of cell 2, as shown in Figure 7. The refraction of light from the image line 5 in passing through the liquid, causes the line to appear displaced as it crosses the prisms.

Figure 4:
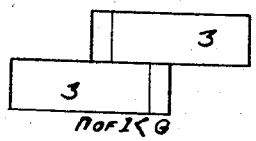
Figures 4, 5 and 6 are diagrammatical top views of the prisms employed in the microrefractometer showing displacements of the image line with liquids having, lower (Figure 4), the same (Figure 5) and higher (Figure 6) refractive index than that of the glass.
Figure 5:
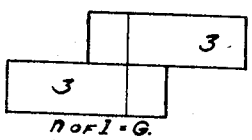
Figure 6:
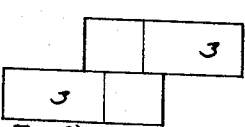
Figure 8:
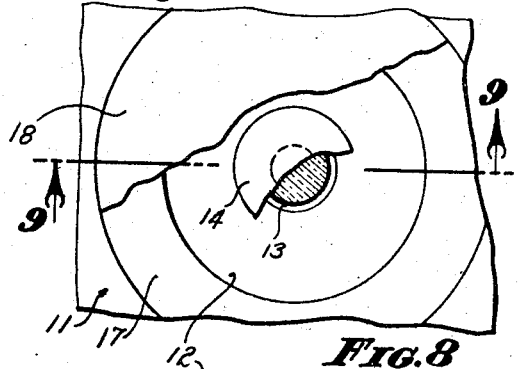
Figure 8 is an enlarged fragmentary plan view of a modified form of the microrefractometer.
Figure 9:
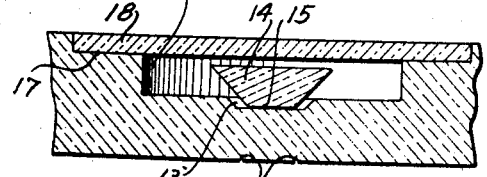
Figure 9 is an enlarged sectional view thereof taken through line 9—9 of Figure 8.

The magnitude of the distance between the lines crossing the prisms and its sign is determined by the refraction index of the liquid in the cell, as shown in Figures 4, 5 and 6. The displacement; that is, distance between the refracted lines, is observed by means of a microscope equipped with a micrometer eyepiece scale. A calibration graph which sets forth displacement versus refractive index of several known liquids is used in conjunction with the scale reading observed through the microscope.

With reference to Figure 7 the "$n$" or refractive index of one type of glass has been found to be about 1.54. $\angle i$ is equal to the bevelled angle of the prism. Therefore, $$\sin r = \frac{ng}{nl} \sin i$$

The $\angle r - i$ is the angular displacement of the image line. The distance $d$ that the image line is displaced is then $h \tan (r-i)$; and, for the two prisms the calculated displacement is $2d = 2h \tan (r-i)$. The calculated and observed displacements have been found to agree within experimental error.

With reference to Figures 8 to 12 inclusive, a single conical prism is substituted for the two flat faced prisms described hereinbefore with the result that the image is in the form of a circle rather than a line. A glass slide 11 is provided with a circular recess or cell 12 having a depression 13 centered therein. A frusto-conical prism 14 is set in the depression 13 with its larger end upward, the lower end of the prism being cemented to the bottom of the depression, as indicated by 15. An image ring 16 is inscribed on the lower surface of the glass slide.

Figures 10, 11, 12:
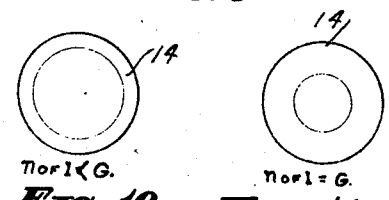
Figures 10, 11 and 12 are diagrammatical top views of the prism used in the modified microrefractometer showing displacements of the image line with liquids having, lower (Figure 10), the same (Figure 11) and higher (Figure 12) refractive index than that of the glass.

As in the first structure the cell 12 is provided with a marginal recess 17 which receives a cover 18. In this arrangement the liquid sample is placed in the depression 13 and forms by capillary action an annular wedge around the prism 14 between its bevelled face and the bottom of the depression 13. If the refractive index of the liquid is equal to that of the glass, the image ring 16 will appear normal size as in Figure 11. If the refractive index is greater than that of the glass, the image ring will appear smaller, as shown in Figure 12 and conversely if the refractive index of the liquid is less than that of the glass, the ring will appear larger than normal, as shown in Figure 10. The difference in radii of the actual ring 16 and the apparent ring is equal to the displacement $d$ of Figure 7 so that, as in the first case, $2d = 2h \tan(r-i)$.

Various changes and alternate arrangements may be made within the scope of the appended claims.

I claim:

1. A microrefractometer comprising: a transparent slide having a flat face; prism means defining with said face opposed wedge-like spaces into which liquids are attracted by capillary action; and an image line inscribed on the under side of said slide in position to be viewed in part through each of said opposed wedge-like spaces and a liquid contained therein, the parts of said line being apparently displaced in opposite directions in proportion to the refractive index of said liquid.

2. A microrefractometer for volatile liquids comprising: a transparent slide having a depression therein; prism means in said depression and defining therewith opposed wedge-like spaces into which liquids are attracted by capillary action; and an image line on the under side of said slide having portions adapted to be inspected through said opposed wedge-like spaces and a liquid contained therein, whereby the portions of said line are apparently displaced in opposite directions in relation to the actual position of said line and in proportion to the index of refraction of said liquid; and a transparent cover for sealing said depression.

3. A microrefractometer for volatile liquids comprising: a transparent slide having a depression therein; a prism in said depression and defining with the bottom thereof a wedge-like space into which liquids are attracted by capillary action; and an image line on the under side of said slide in position for inspection in part through said prism and a liquid in said wedge-like space and in part beyond said prism whereby the apparent displacement of said line from its true position may be measured to determine the index of refraction of said liquid; and a transparent cover for said depression to seal the liquid therein.

4. A microrefractometer, comprising: a transparent base member; a frusto-conical prism mounted on said base member with its small end down to define therewith an annular space of wedge-like shape into which liquids are attracted by capillary action; and a circular image line on said base member positioned to be viewed through said conical prism and the liquid contained in said annular wedge-like space to produce an annular image altered in size.

CLARK WEBSTER GOULD, JR.

REFERENCES CITED

The following references are of record in the file of this patent:

UNITED STATES PATENTS

| Number | Name | Date |
|---|---|---|
| 2,047,561 | Jelley | July 14, 1936 |